US012294174B2

(12) United States Patent
Okano et al.

(10) Patent No.: US 12,294,174 B2
(45) Date of Patent: May 6, 2025

(54) CONNECTOR WITH FERRITE CORE-RECEIVING HOUSING

(71) Applicant: SUMITOMO WIRING SYSTEMS, LTD., Mie (JP)

(72) Inventors: Hiroki Okano, Mie (JP); Takashi Nobukuni, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 118 days.

(21) Appl. No.: 17/954,451

(22) Filed: Sep. 28, 2022

(65) Prior Publication Data

US 2023/0100442 A1 Mar. 30, 2023

(30) Foreign Application Priority Data

Sep. 29, 2021 (JP) ................................ 2021-158935

(51) Int. Cl.

*H01R 13/502* (2006.01)
*H01R 13/66* (2006.01)
*H01R 13/719* (2011.01)
*H01R 13/7193* (2011.01)
*H01R 13/7195* (2011.01)
*H01R 13/7197* (2011.01)

(52) U.S. Cl.

CPC ..... *H01R 13/5025* (2013.01); *H01R 13/6608* (2013.01); *H01R 13/719* (2013.01); *H01R 13/7193* (2013.01); *H01R 13/7195* (2013.01); *H01R 13/7197* (2013.01)

(58) Field of Classification Search

CPC ............ H01R 13/7193; H01R 13/7195; H01R 13/719; H01R 13/5025; H01R 13/6608

See application file for complete search history.

(56) References Cited

U.S. PATENT DOCUMENTS

| | | | | |
|---|---|---|---|---|
| 8,992,259 B2 * | 3/2015 | Miwa | H01R 13/7193 439/620.05 |
| 2002/0137397 A1 * | 9/2002 | Little | H01R 13/7032 439/686 |
| 2023/0102502 A1 * | 3/2023 | Okano | H01R 13/7193 439/752 |

FOREIGN PATENT DOCUMENTS

| | | |
|---|---|---|
| JP | 2005-044643 A | 2/2005 |
| JP | 2007-087681 A | 4/2007 |

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

The present invention aims to stably arrange a ferrite core in a housing. A connector 10 includes a ferrite core 12, and a housing 11 including a receiving portion 20 that receives the ferrite core 12. At least one of an inner peripheral surface 23 of the receiving portion 20 and an outer peripheral surface 12A of the ferrite core 12 includes a protrusion (first protrusion 21, for example) that is in contact with the other peripheral surface so as to hold the ferrite core 12 within the receiving portion 20.

6 Claims, 18 Drawing Sheets

CONNECTOR WITH FERRITE CORE-RECEIVING HOUSING

CROSS-REFERENCE TO RELATED APPLICATIONS

This application is based on and claims priority from Japanese Patent Application No. 2021-158935, filed on Sep. 29, 2021, with the Japan Patent Office, the disclosure of which is incorporated herein in its entirety by reference.

TECHNICAL FIELD

The present disclosure relates to a connector.

BACKGROUND

Japanese Patent Laid-open Publication No. 2005-044643 discloses a connector including a ferrite core (electric component). This ferrite core is received in a receiving portion of a housing (connector housing). The ferrite core has a through hole, and a terminal fitting (socket contact) is inserted into the through hole. Then, a cap is engaged with the housing, thereby preventing the ferrite core and the terminal fitting from coming out rearward. Note that Japanese Patent Laid-open Publication No. 2007-087681 also discloses a connector including a ferrite core.

SUMMARY

In the configuration of Japanese Patent Laid-open Publication No. 2005-044643, since the ferrite core is not held in the through hole, there is a problem that the ferrite core can easily come out rearward in a stage before the cap is engaged with the housing. Also, even after the cap is engaged with the housing, there is a risk that the ferrite core rattles in the through hole.

Therefore, it is an object of the present disclosure to provide a technique that allows a ferrite core to be stably arranged in a housing.

According to the present disclosure, a connector includes: a ferrite core; and a housing including a receiving portion that receives the ferrite core, wherein at least one of an inner peripheral surface of the receiving portion and an outer peripheral surface of the ferrite core includes a protrusion that is in contact with the other peripheral surface so as to hold the ferrite core within the receiving portion.

According to the present disclosure, it is possible to arrange a ferrite core stably in a housing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
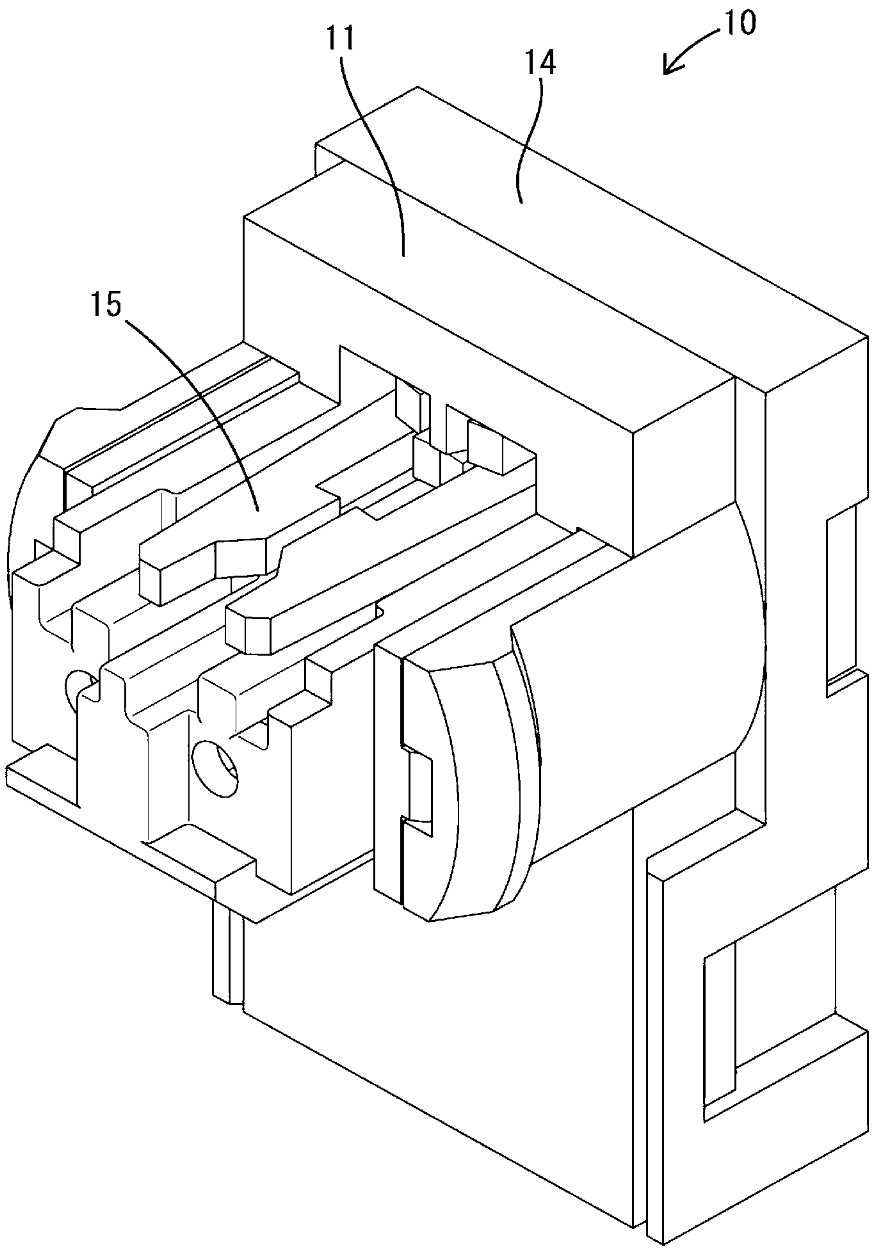
FIG. 1 is a perspective view illustrating a connector according to Embodiment 1.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure will be listed and described.

(1) According to the present disclosure, a connector includes: a ferrite core; and a housing including a receiving portion that receives the ferrite core, wherein at least one of an inner peripheral surface of the receiving portion and an outer peripheral surface of the ferrite core includes a protrusion that is in contact with the other peripheral surface so as to hold the ferrite core within the receiving portion.

According to this connector, it is possible to stably arrange the ferrite core within the receiving portion.

(2) Preferably, the protrusion protrudes only from, out of the inner peripheral surface of the receiving portion and the outer peripheral surface of the ferrite core, the inner peripheral surface of the receiving portion.

Since the ferrite core does not need to have any protrusion, it is possible to avoid complication of the structure of the ferrite core.

(3) Preferably, the receiving portion includes a deflectable portion that is deflectable and deformable outward, and the deflectable portion presses the ferrite core and holds the ferrite core in the receiving portion with the protrusion being in contact with the other peripheral surface.

According to this connector, when the ferrite core is being received in the receiving portion, the deflectable portion is pressed from the outer peripheral surface of the ferrite core via the protrusion and deflects outward, making it possible to reduce the frictional force that occurs during the reception. Moreover, the connector can improve the holding force of holding the ferrite core, using the elastic recovery force of the deflectable portion.

(4) Preferably, the receiving portion includes an opening that exposes the outer peripheral surface of the ferrite core received in the receiving portion to the outside of the housing.

According to this connector, it is possible to check from the outside through the opening whether or not the ferrite core is arranged within the receiving portion.

(5) Preferably, the inner peripheral surface of the receiving portion includes a first inner surface and a second inner surface that face each other, the ferrite core and the protrusion are arranged between the first inner surface and the second inner surface, the housing has a gap portion that opens the receiving portion to a side different from a side on which the first inner surface and the second inner surface face each other, and at least one of the first inner surface and the second inner surface, and a portion of the outer peripheral surface of the ferrite core that faces the at least one inner surface have parts that are fitted to each other in a male-female fitting manner so as to restrict displacement of the ferrite core toward the gap portion.

According to this connector, it is possible to suppress displacement of the ferrite core toward the gap portion, and maintain the state in which the male portion is in contact with the female portion.

DETAIL OF EMBODIMENT OF PRESENT DISCLOSURE

The following will describe details of the embodiment of the present disclosure with reference to the drawings. Note that the present invention is not limited to these examples, and is defined by the claims. All modifications within the meaning and scope equivalent to the scope of the claims are intended to be included.

Embodiment 1

Figure 14:
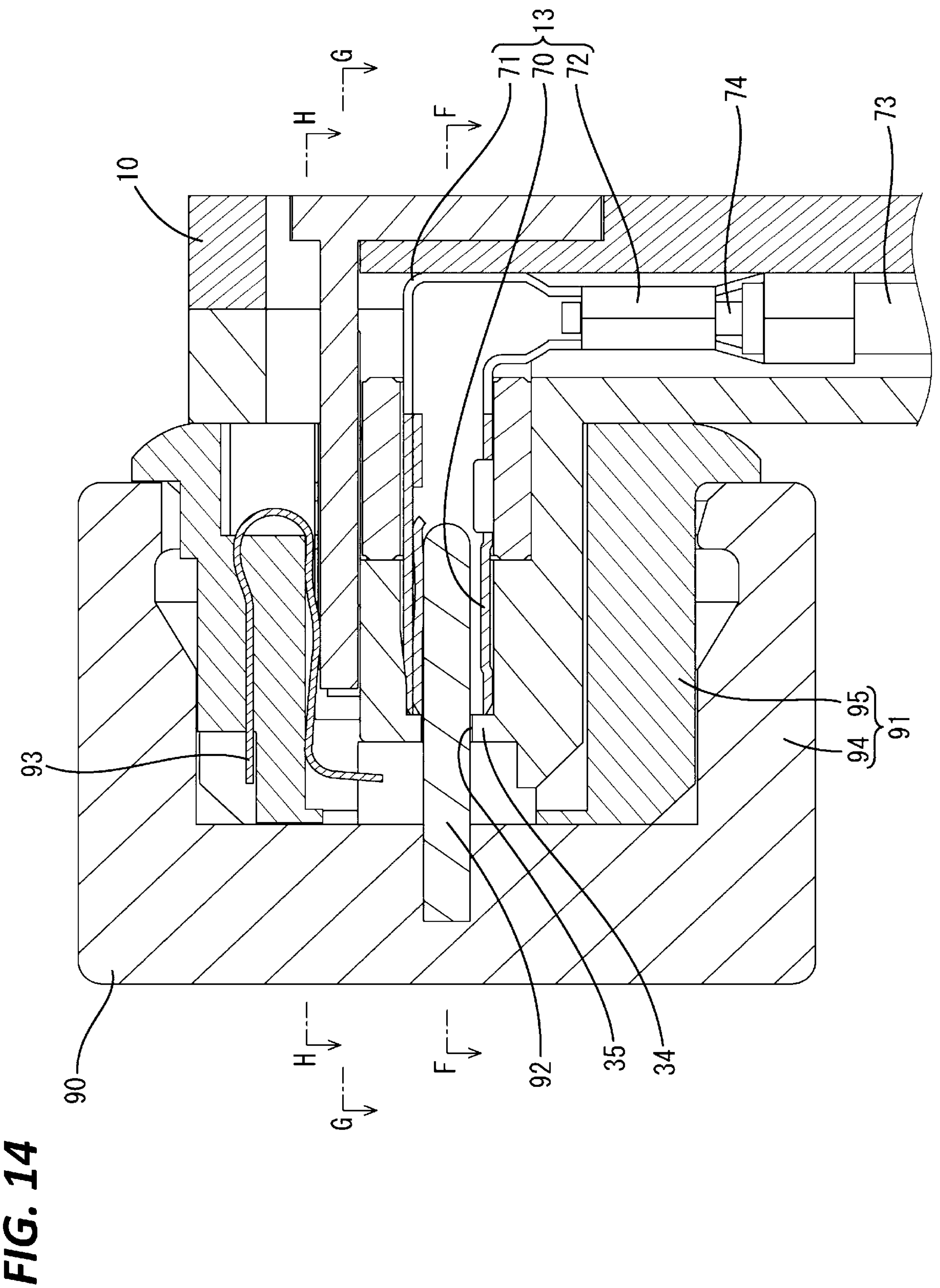
FIG. 14 is a cross-sectional side view illustrating a state in which the connector is fitted to a counterpart connector.

FIG. 1 discloses a connector 10 according to Embodiment 1. The connector 10 is fitted to a counterpart connector 90 as shown in FIG. 14. In the following description, the direction in which the connector 10 is fitted to the counterpart connector 90 is defined as frontward of the connector 10, and the direction opposite thereof is defined as rearward of the connector 10. Also, the up-down direction in FIGS. 3 to 9, 11, and 14 is directly defined as the up-down direction of the connector 10. Also, the left-right direction seen from the front side is defined as the left-right direction of the connector 10.

Figure 2:
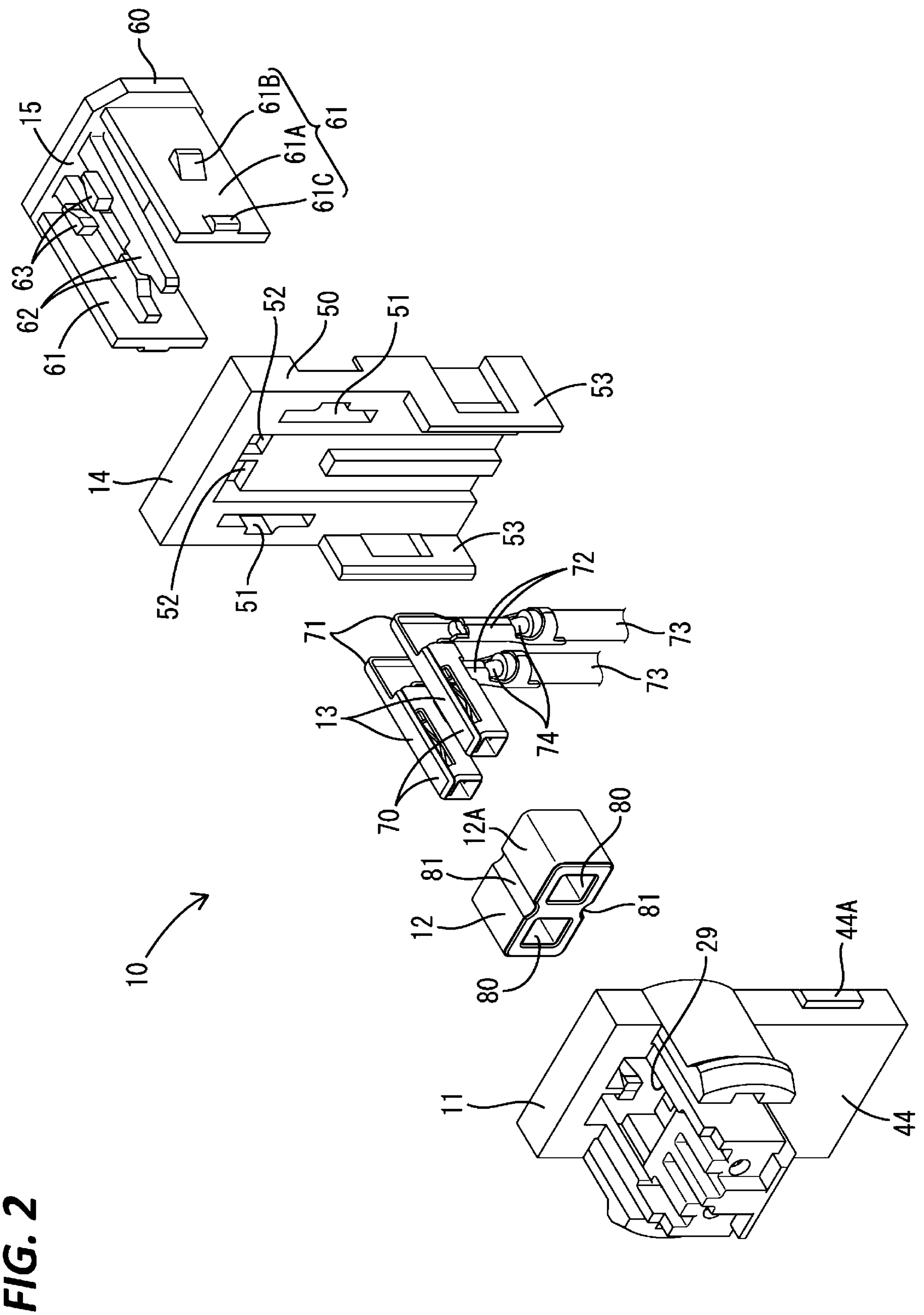
FIG. 2 is an exploded perspective view of the connector of Embodiment 1.

As shown in FIG. 2, the connector 10 includes a housing 11, a ferrite core 12, terminal fittings 13, a cover member 14, and a detection member 15.

Terminal Fitting 13

Figure 11:
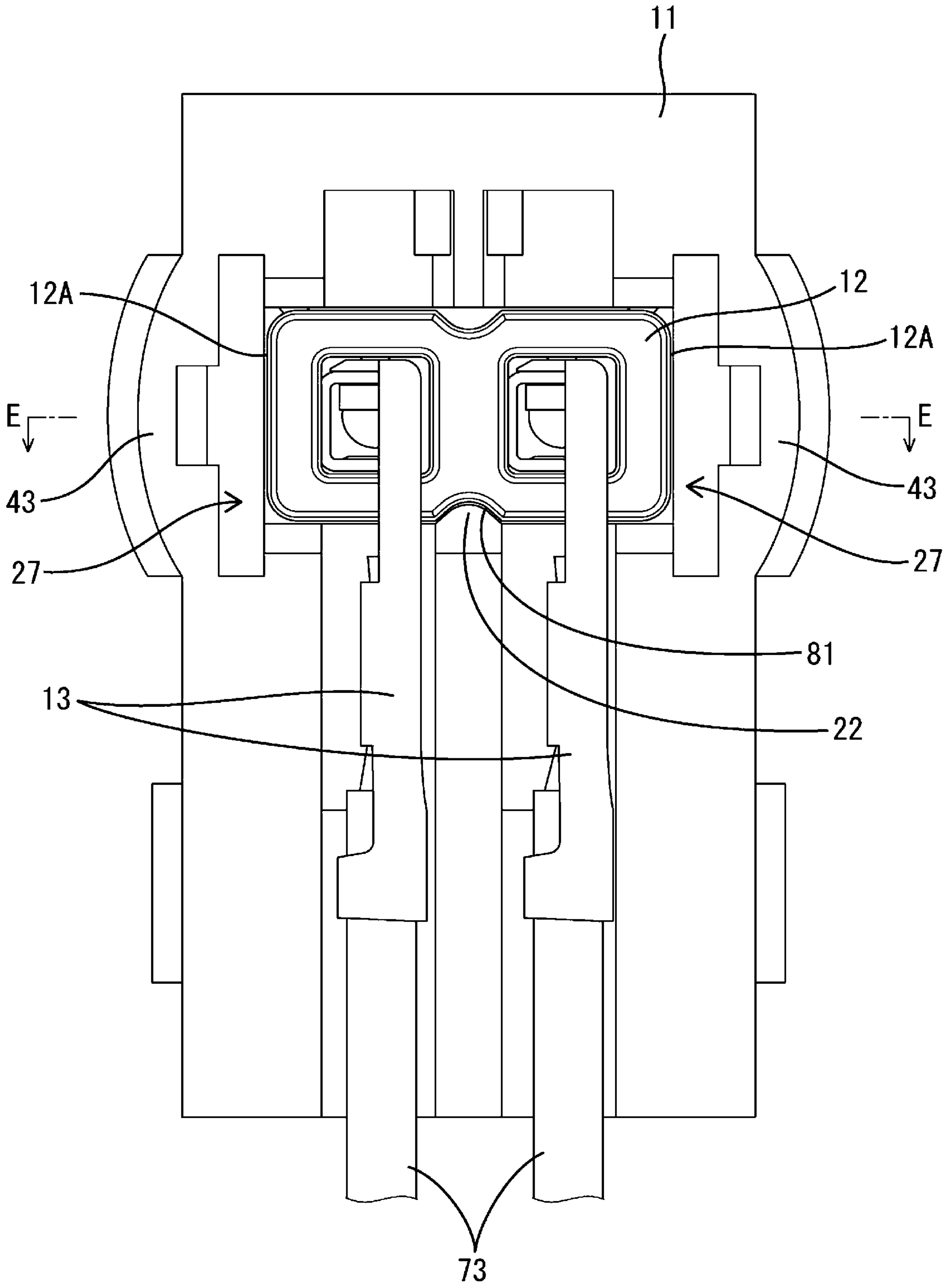
FIG. 11 is a back view illustrating the state in which the ferrite core and the terminal fittings are assembled into the housing.

The terminal fittings 13 are made of metal, and are formed by bending and processing a metal plate, for example. As shown in FIGS. 2 and 14, the terminal fittings 13 are female dies. The terminal fittings 13 are L-shaped. Each of the terminal fittings 13 includes a tubular portion 70, a bent portion 71, and a wire connection portion 72. The tubular portion 70 is tubular (rectangularly tubular in the present embodiment), and extends in the front-rear direction. The bent portion 71 is provided between the tubular portion 70 and the wire connection portion 72. The wire connection portion 72 extends in the up-down direction. A conductor 74 of a covered wire 73 is electrically connected to the wire connection portion 72 by crimping or the like. As shown in FIG. 11, a plurality of (two in the present embodiment) terminal fittings 13 are provided, and are arranged at a distance in the left-right direction.

Ferrite Core 12

As shown in FIG. 2, the ferrite core 12 includes first holes 80 and fitting grooves 81. The first holes 80 penetrate the ferrite core 12 in the front-rear direction. A plurality of (two in the present embodiment) first holes 80 are provided at a distance in the left-right direction. The terminal fittings 13 are respectively inserted into the first holes 80. The fitting grooves 81 are provided on both upper and lower sides of an outer peripheral surface 12A of the ferrite core 12. The fitting grooves 81 extend in the front-rear direction. The fitting grooves 81 are formed over the entire region of the ferrite core 12 in the front-rear direction.

Housing 11

Figure 3:
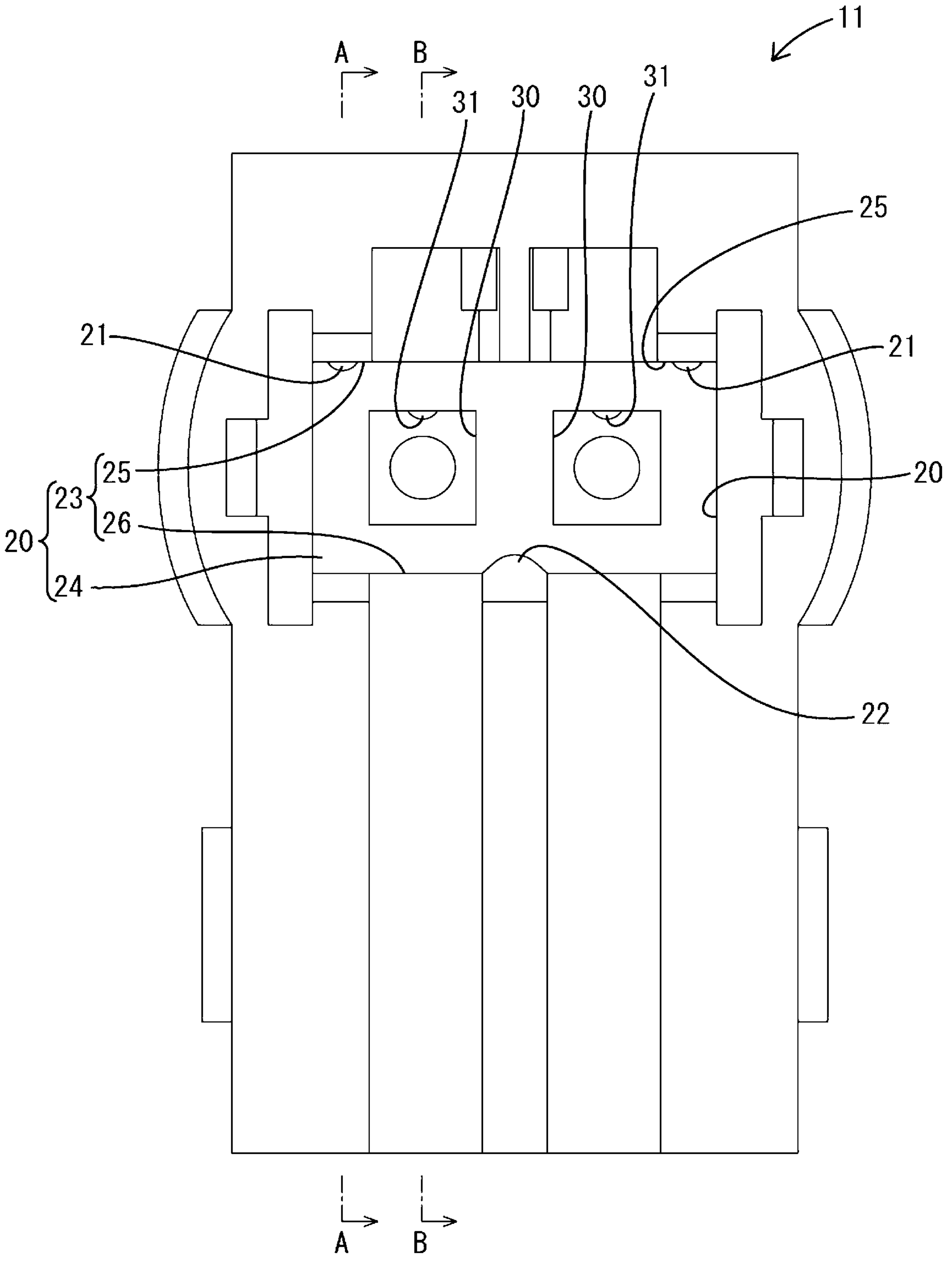
FIG. 3 is a back view of a housing.

The housing 11 is made of a synthetic resin, and is insulating. As shown in FIG. 3, the housing 11 includes a receiving portion 20, first protrusions 21, and a fitting protrusion 22.

Figure 4:
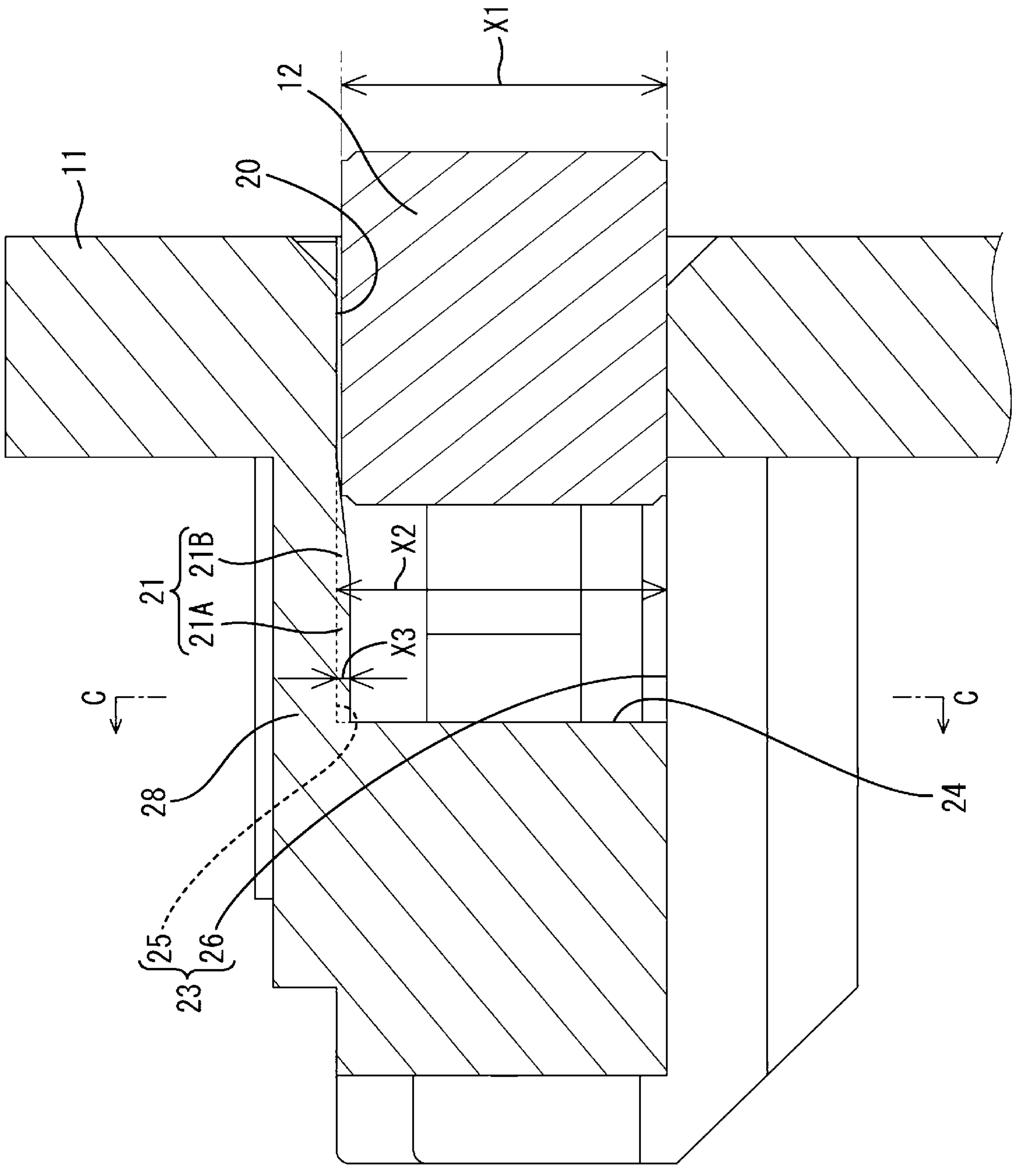
FIG. 4 is a cross-sectional view taken along a line A-A in FIG. 3, illustrating a midway state where a ferrite core is being housed in a receiving portion.
Figure 5:
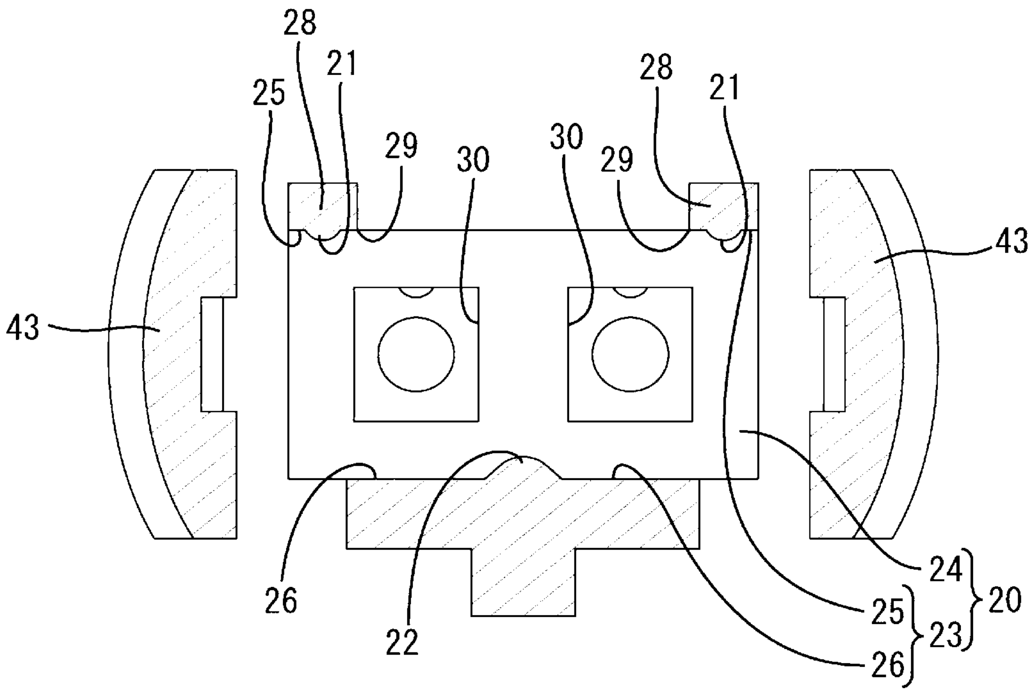
FIG. 5 is a cross-sectional view taken along a line C-C in FIG. 4.
Figure 13:
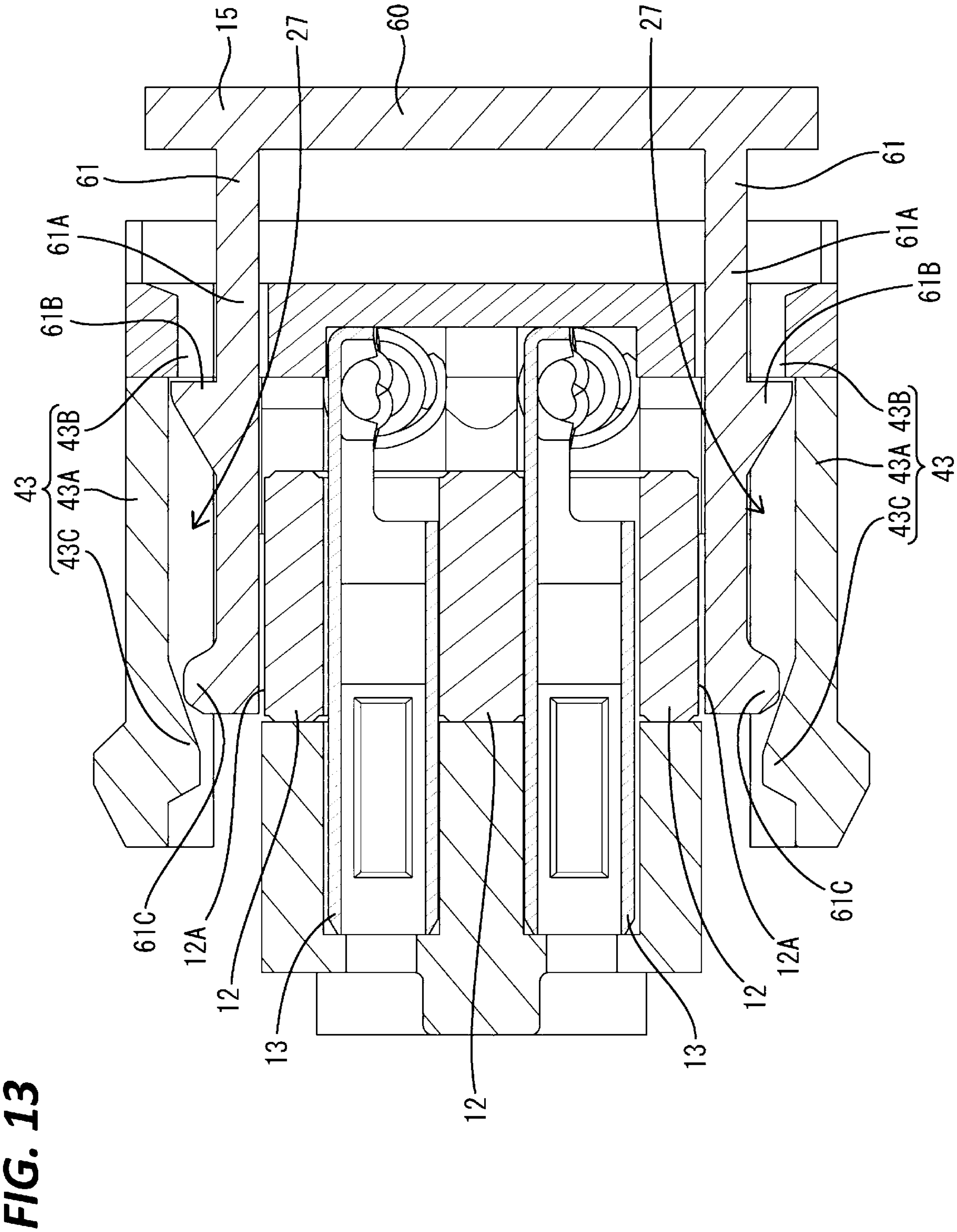
FIG. 13 is a cross-sectional view taken along a line E-E in FIG. 11, illustrating a state in which the detection member is provisionally engaged with the housing.

As shown in FIG. 4, the internal space of the receiving portion 20 is open to the rear. The ferrite core 12 is received in the receiving portion 20 from the rear. The receiving portion 20 includes an inner surface 23 and a back surface 24, as shown in FIGS. 4 and 5. The inner surface 23 of the receiving portion 20 includes first inner surfaces 25 and a second inner surface 26. The first inner surfaces 25 are provided on the upper side and face downward. The second inner surface 26 is provided on the lower side and faces upward. A plurality of (two in the present embodiment) first inner surfaces 25 are provided at a distance in the left-right direction. The second inner surface 26 is arranged, in the left-right direction, between the left end of the first inner surface 25 located on the left side and the right end of the first inner surface 25 located on the right side. The internal space of the receiving portion 20 is open in the left-right direction. The housing 11 includes gap portions 27 on both left and right sides of the internal space of the receiving portion 20. As shown in FIG. 13, the gap portions 27 serve as a space that allows a later-described second elastic engagement portion 61 of the detection member 15 to enter an area between left and right end surfaces of the outer peripheral surface 12A of the ferrite core 12 received in the receiving portion 20, and a later-described first elastic engagement portion 43. The back surface 24 has later-described second holes 30. A plurality of (two in the present embodiment) second holes 30 are provided at a distance in the left-right direction.

The first protrusions 21 correspond to "protrusions". As shown in FIGS. 4 and 5, the first protrusions 21 protrude from the first inner surfaces 25. The plurality of first protrusions 21 are provided at a distance in the left-right direction. The first protrusions 21 are arranged on the back surface 24 side of the receiving portion 20. The first protrusions 21 extend in the front-rear direction. The front ends of the first protrusions 21 are contiguous to the back surface 24. The first protrusions 21 have a width in the left-right direction that is smaller than the width of the first inner surfaces 25 in the left-right direction. Each of the first protrusions 21 includes a first front-side protrusion 21A and a first rear-side protrusion 21B. A central portion of the first front-side protrusion 21A in the left-right direction bulges and is curved downward. A front end of the first front-side protrusion 21A is contiguous to the back surface 24. The protrusion dimension of the first front-side protrusion 21A is constant in the front-rear direction. A front end of the first rear-side protrusion 21B is contiguous to the back end of the first front-side protrusion 21A. The protrusion dimension of the first rear-side protrusion 21B is reduced toward the rear side. The first protrusion 21 is provided on the left side relative to the second hole 30 at the left end, and is also provided on the right side relative to the second hole 30 at the right end. Letting the maximum dimension in the up-down direction of the outer peripheral surface 12A of the ferrite core 12 be X1, the distance in the up-down direction between the first inner surfaces 25 and the second inner surface 26 be X2, and the maximum protrusion dimension of the first protrusion 21 (in other words, the protrusion dimension of the first front-side protrusion 21A) be X3, the relationship $X2-X3<X1$ is satisfied.

The fitting protrusion 22 is provided on the second inner surface 26. The fitting protrusion 22 extends in the front-rear direction. A central portion of the fitting protrusion 22 in the left-right direction bulges and is curved upward. The protrusion dimension of the fitting protrusion 22 is constant in the front-rear direction. The fitting protrusion 22 is arranged between two first protrusions 21 in the left-right direction, and is arranged between two second holes 30.

As shown in FIGS. 4 and 5, the receiving portion 20 includes first deflectable portions 28. The first deflectable portions 28 correspond to "deflectable portions". The first deflectable portions 28 have a double-supported shape such that both front and rear ends thereof are supported, and are capable of deflecting and deforming outward. The front ends of the first deflectable portions 28 are coupled to and are supported on a wall portion constituting the back surface 24 of the receiving portion 20. The rear ends of the first deflectable portions 28 are coupled to and are supported on the lower end of a later-described installation portion 40. A plurality of (two in the present embodiment) first deflectable portions 28 are provided at a distance in the left-right direction. The inner surfaces of the first deflectable portions 28 constitute part of the inner surface 23 of the receiving portion 20. The inner surfaces of the plurality of first deflectable portions 28 are each provided with the first protrusion 21. The front end of the first protrusion 21 is aligned with the front end of the first deflectable portion 28 with respect to the position in the front-rear direction. The rear end of the first protrusion 21 is aligned with the rear end of the first deflectable portion 28 with respect to the position in the front-rear direction. Note that the rear end of the first protrusion 21 may also be arranged forward of the rear end of the first deflectable portion 28.

Figure 10:
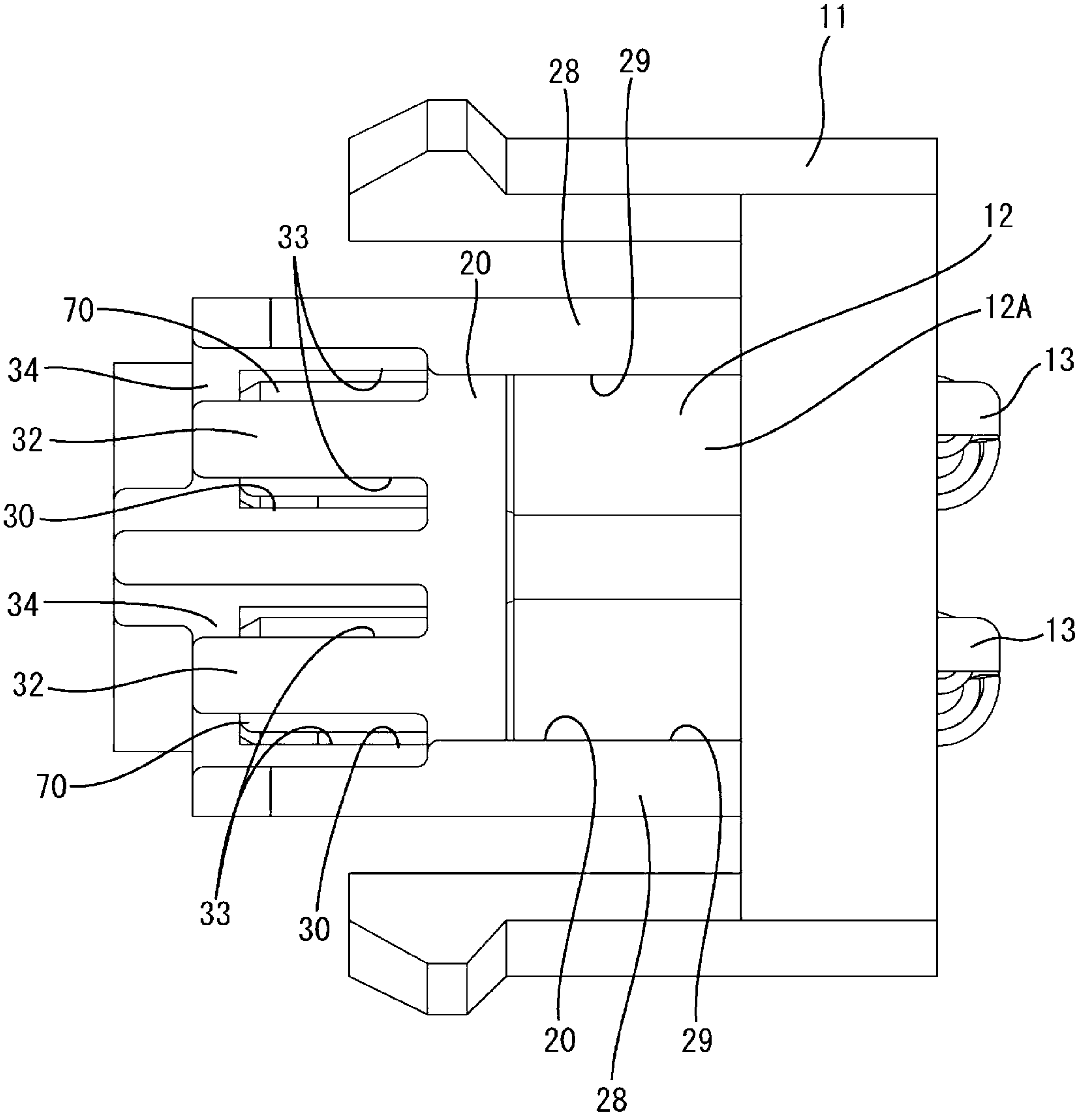
FIG. 10 is a plan view illustrating a state in which the ferrite core and the terminal fittings are assembled into the housing.

As shown in FIGS. 5 and 10, the receiving portion 20 has a first opening 29. The first opening 29 corresponds to an "opening". The first opening 29 exposes the outer peripheral surface 12A of the ferrite core 12 received in the receiving portion 20 to the outside of the housing 11. The first opening 29 is provided between two first deflectable portions 28.

Figure 7:
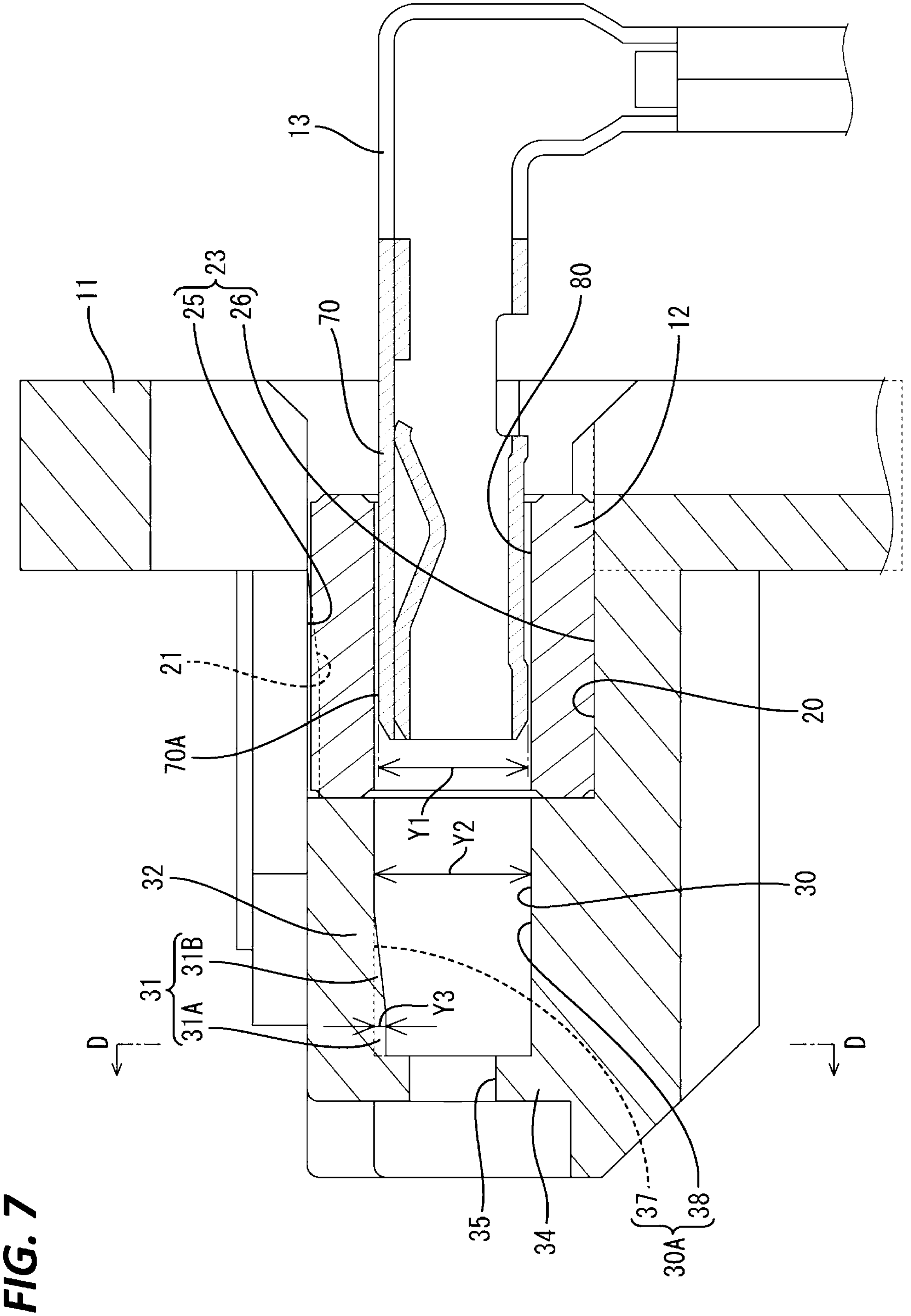
FIG. 7 is a cross-sectional view taken along a line B-B in FIG. 3, illustrating a midway state where a terminal fitting is being inserted into a cavity constituted by first holes and second holes.
Figure 8:
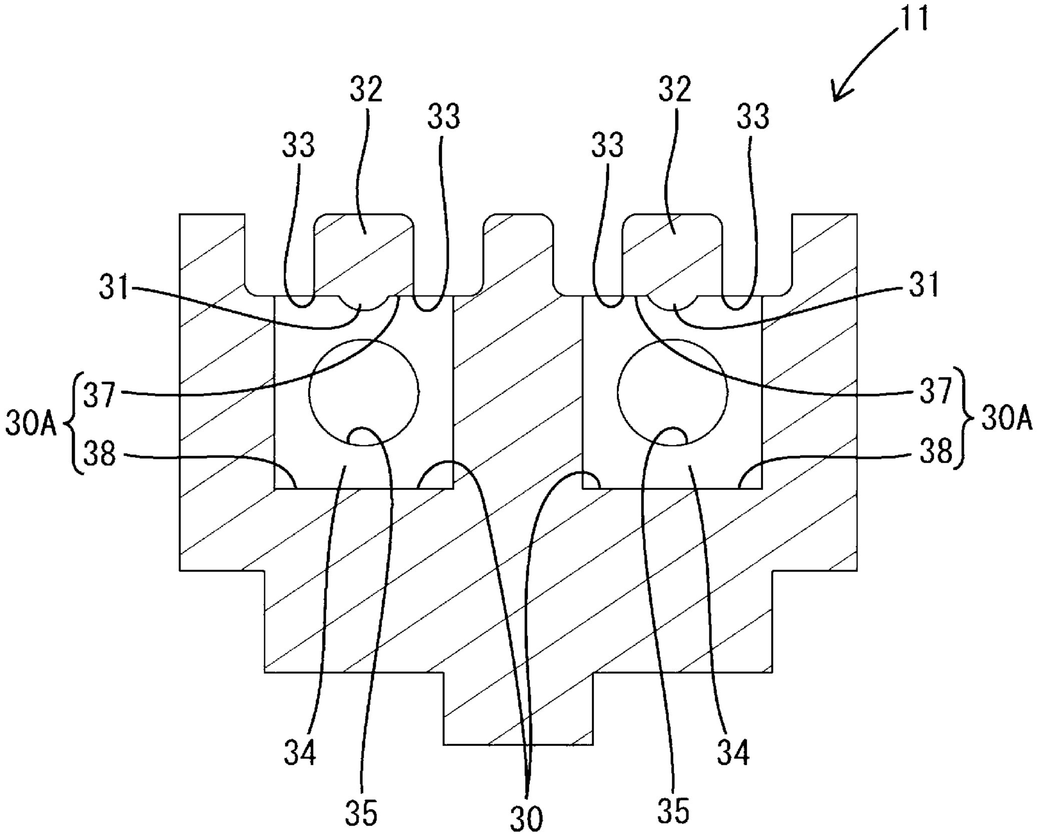
FIG. 8 is a cross-sectional view taken along a line D-D in FIG. 7.

As shown in FIGS. 7 and 8, the housing 11 includes the second holes 30, the second protrusions 31, the second deflectable portions 32, the second openings 33, the front walls 34, and insertion holes 35.

As shown in FIG. 7, the second holes 30 are in communication with the internal space of the receiving portion 20, and extend forward from the internal space of the receiving portion 20. The second holes 30 are arranged in front of the first holes 80 of the ferrite core 12 received in the receiving portion 20. The second holes 30 constitute, together with the first holes 80, cavities that extend in the front-rear direction. The dimension of the inner peripheral surfaces 30A of the second holes 30 in the up-down direction is equal to the dimension of the inner peripheral surfaces of the first holes 80 in the up-down direction, and the dimension of the inner peripheral surfaces 30A of the second holes 30 in the left-right direction is equal to the dimension of the inner peripheral surfaces of the first holes 80 in the left-right direction. The terminal fittings 13 inserted into the first holes 80 from the rear reach the second holes 30. The front walls 34 are provided in front of the second holes 30. The front walls 34 restrict forward movement of the terminal fittings 13 arranged in the second holes 30. The insertion holes 35 penetrate the front walls 34 in the front-rear direction. The second holes 30 are in communication with the insertion holes 35. Counterpart terminal fittings 92 of the counterpart connector 90 externally inserted via the insertion hole 35 are electrically connected to the terminal fittings 13 arranged in the second holes 30 (see FIG. 14). The inner peripheral surface 30A of each second hole 30 include a first surface 37 and a second surface 38. The first surface 37 is provided on the upper side and face downward. The second surface 38 is provided on the lower side and face upward. The first surface 37 and the second surface 38 face each other.

As shown in FIGS. 7 and 8, the second protrusions 31 protrude from the first surfaces 37 of the second holes 30. The second protrusions 31 are arranged on the front-end side of the respective second holes 30. The second protrusions 31 extend in the front-rear direction. The front ends of the second protrusions 31 are contiguous to the rear end of the front wall 34. The width of the second protrusions 31 in the left-right direction is smaller than the width of the first surfaces 37 in the left-right direction. The second protrusions 31 each include a second front-side protrusion 31A and a second rear-side protrusion 31B. A central portion of the second front-side protrusion 31A in the left-right direction bulges and is curved downward. The front ends of the second front-side protrusions 31A are contiguous to the rear end of the front wall 34. The protrusion dimension of the second front-side protrusions 31A is constant in the front-rear direction. The front ends of the second rear-side protrusions 31B are contiguous to the rear ends of the second front-side protrusions 31A. The protrusion dimension of the second rear-side protrusions 31B are reduced toward the rear side. Letting the maximum dimension in the up-down direction of the tubular portions 70 of the terminal fittings 13 be Y1, the distance in the up-down direction between the first surface 37 and the second surface 38 be Y2, and the maximum protrusion dimension of the second protrusion 31 (in other words, the protrusion dimension of the second front-side protrusion 31A) be Y3, a relationship $Y2-Y3<Y1$ is satisfied.

As shown in FIGS. 7, 8, and 10, the second deflectable portions 32 have a double-supported shape such that both front and rear ends thereof are supported, and are capable of deflecting and deforming outward. The front end portions of the second deflectable portions 32 are supported on the respective front walls 34, and the rear end portions of the second deflectable portions 32 are supported on a wall that constitutes the back surface 24 of the receiving portion 20. The inner surfaces of the second deflectable portions 32 constitute part of the inner peripheral surface 30A of the second hole 30. The inner surfaces of the second deflectable portions 32 are each provided with the second protrusion 31. The front end of the second protrusion 31 is aligned with the front end of the second deflectable portion 32 with respect to the position in the front-rear direction. The rear end of the second protrusion 31 is arranged forward relative to the rear end of the second deflectable portion 32. Note that the rear end of the second protrusion 31 may also be aligned with the rear end of the second deflectable portion 32 with respect to the position in the front-rear direction.

As shown in FIGS. 8 and 10, the second openings 33 expose the tubular portions 70 arranged in the second holes 30 to the outside of the housing 11. The second openings 33 expose the front ends of the tubular portions 70 to the outside of the housing 11. The second openings 33 are provided on both the left and right sides of the second deflectable portion 32.

Figure 12:
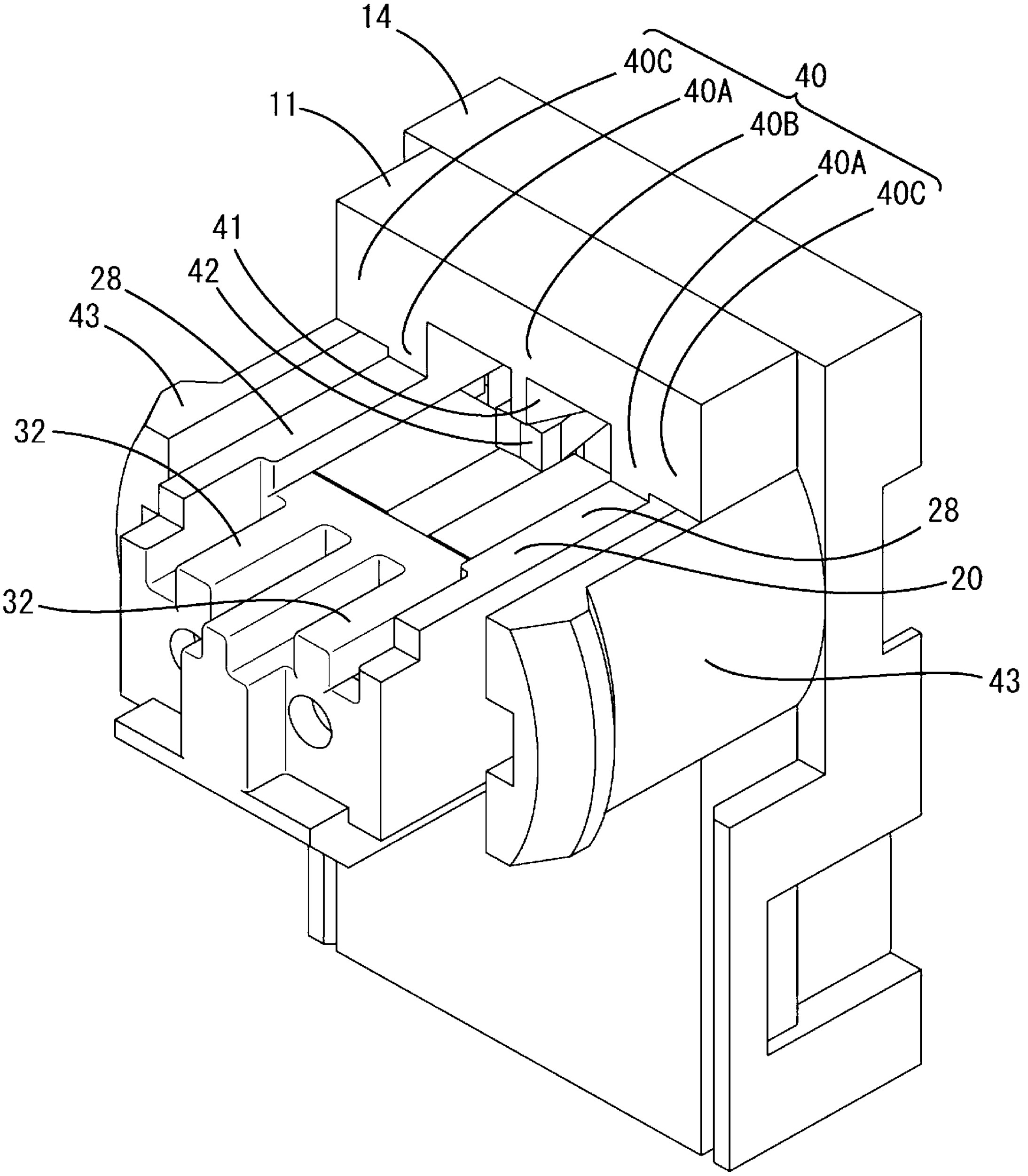
FIG. 12 is a perspective view illustrating a state in which the ferrite core, the terminal fittings, and a cover member are assembled into the housing.

As shown in FIG. 12, the housing 11 includes an installation portion 40, a restriction portion 41, and a guide portion 42. The installation portion 40 couples the left and right sides of the upper end portion of the receiving portion 20. The installation portion 40 includes leg portions 40A that extend from the left and right sides of the receiving portion 20, a coupling portion 40B that couples the leg portions 40A on the left and right sides to each other, and extension portions 40C that extend from the leg portions 40A on the left and right sides to the outside in the left-right direction. The restriction portion 41 is provided below the coupling portion 40B. The restriction portion 41 restricts forward movement of the detection member 15. The guide portion 42 is provided below the restriction portion 41. The guide portion 42 guides a later-described pair of lock arms 62 of the detection member 15 so that they extend to the outside in the left-right direction.

As shown in FIGS. 12 and 13, the housing 11 includes first elastic engagement portions 43. The pair of first elastic engagement portions 43 are provided at ends of the housing 11 on the left and right sides. The first elastic engagement portions 43 are coupled to the lower surfaces of the extension portions 40C of the installation portion 40 on the left and right sides, and extend forward in a cantilever fashion. The first elastic engagement portion 43 covers the left and right sides of the receiving portion 20. The first elastic engagement portions 43 each include a first elastic plate portion 43A, a first provisional engagement portion 43B, and a first actual engagement portion 43C. The first elastic plate portion 43A extends forward from the installation portion 40 in a cantilever fashion, and has the shape of a plate having a thickness in the left-right direction. The first provisional engagement portion 43B and the first actual engagement portion 43C are provided on the inner side of the first elastic plate portion 43A in the left-right direction. The first provisional engagement portion 43B is arranged rearward of the first actual engagement portion 43C. The detection member 15 is engaged with the first elastic engagement portion 43.

As shown in FIG. 2, the housing 11 includes a vertical portion 44. The vertical portion 44 extends vertically downward from the rear end portion of the receiving portion 20. The vertical portion 44 has the shape of a wall having a thickness in the front-rear direction. The vertical portion 44 includes cover engagement portions 44A.

Cover Member 14

As shown in FIG. 2, the cover member 14 includes a cover body 50, first through holes 51, second through holes 52, and cover-side engagement portions 53. The cover body 50 has the shape of a wall having a thickness in the front-rear direction. The first through holes 51 penetrate the cover body 50 in the front-rear direction. The pair of first through holes 51 are provided on the left and right sides of the cover body 50. The second through holes 52 penetrate the cover body 50 in the front-rear direction. The pair of second through holes 52 are provided on the left and right sides of the cover body 50. The pair of second through holes 52 are arranged inner side in the left-right direction relative to the first through holes 51 provided on the left and right sides. The cover-side engagement portions 53 are deflectable and deformable, and engage with the cover engagement portions 44A of the housing 11.

Detection Member 15

As shown in FIG. 2, the detection member 15 includes a base portion 60, second elastic engagement portions 61, lock arms 62, and interference portions 63. The base portion 60 has the shape of a plate having a thickness in the front-rear direction. The second elastic engagement portions 61 extend forward from the base portion 60 in a cantilever fashion. The pair of second elastic engagement portions 61 are provided on the left and right sides. As shown in FIGS. 2 and 13, each of the second elastic engagement portions 61 includes a second elastic plate portion 61A, a second provisional engagement portion 61B, and a second actual engagement portion 61C. The second elastic plate portion 61A extends forward from the base portion 60 in a cantilever fashion, and has the shape of a plate having a thickness in the left-right direction. The second provisional engagement portion 61B and the second actual engagement portion 61C are provided on the outside of the second elastic plate portion 61A in the left-right direction. The second provisional engagement portion 61B is provided rearward of the second actual engagement portion 61C. The second provisional engagement portions 61B engage with the first provisional engagement portions 43B of the housing 11. With this, the detection member 15 provisionally engages with the housing 11. The second actual engagement portions 61C engage with the first actual engagement portions 43C of the housing 11. Accordingly, the detection member 15 actually engages with the housing 11.

Counterpart Connector 90

Figure 15:
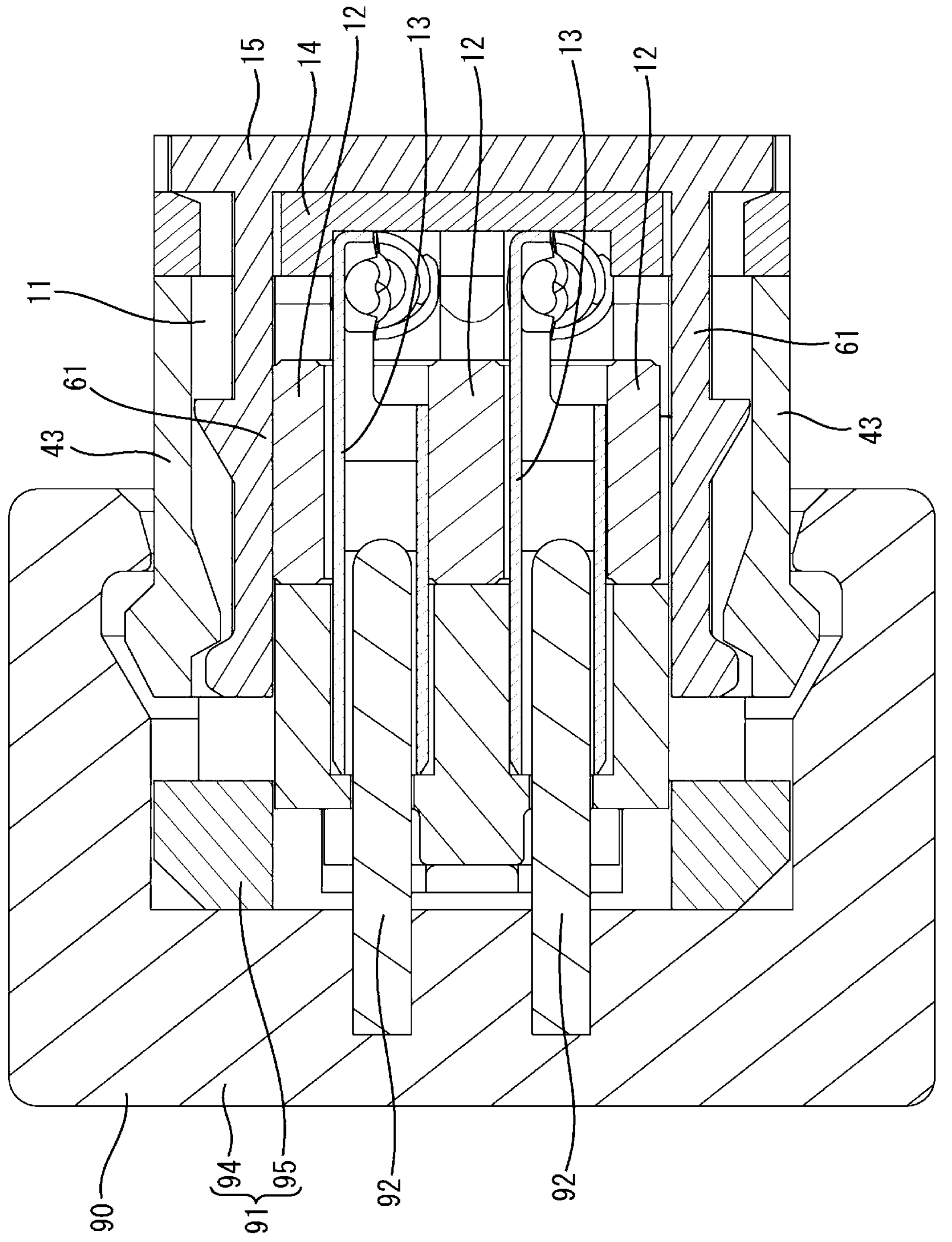
FIG. 15 is a cross-sectional view taken along a line F-F in FIG. 14.
Figure 16:
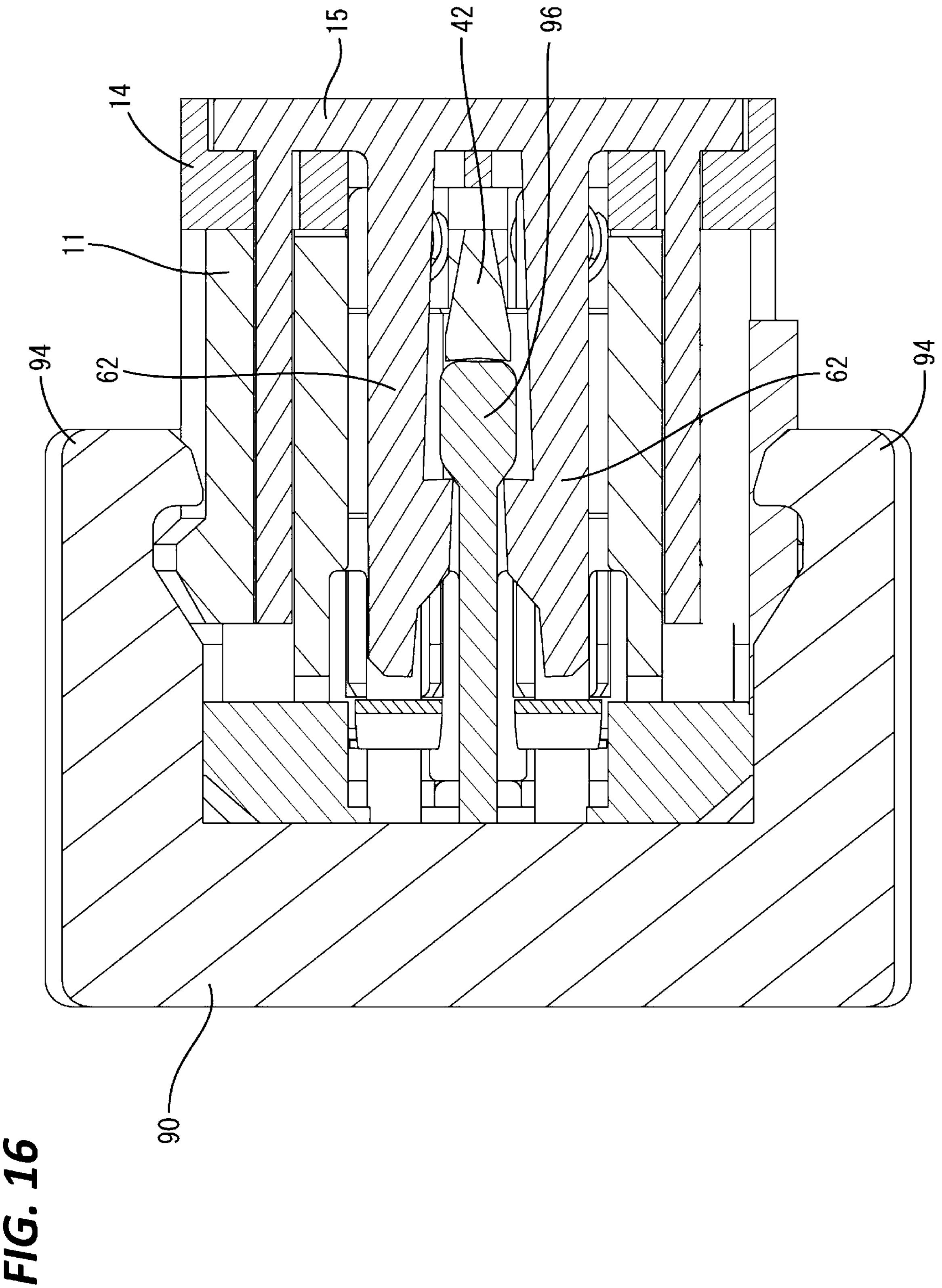
FIG. 16 is a cross-sectional view taken along a line G-G in FIG. 14.

As shown in FIGS. 14 to 16, the counterpart connector 90 includes a counterpart housing 91, counterpart terminal fittings 92, and short-circuit terminals 93. The counterpart housing 91 includes an outer housing 94 and an inner housing 95. The inner housing 95 includes a locked portion 96. A plurality of (two in the present embodiment) counterpart terminal fittings 92 are provided. In a state before the counterpart connector 90 is fitted to the connector 10, the short-circuit terminals 93 are electrically connected to the two counterpart terminal fittings 92, respectively.

Assembling of Connector 10

Figure 6:
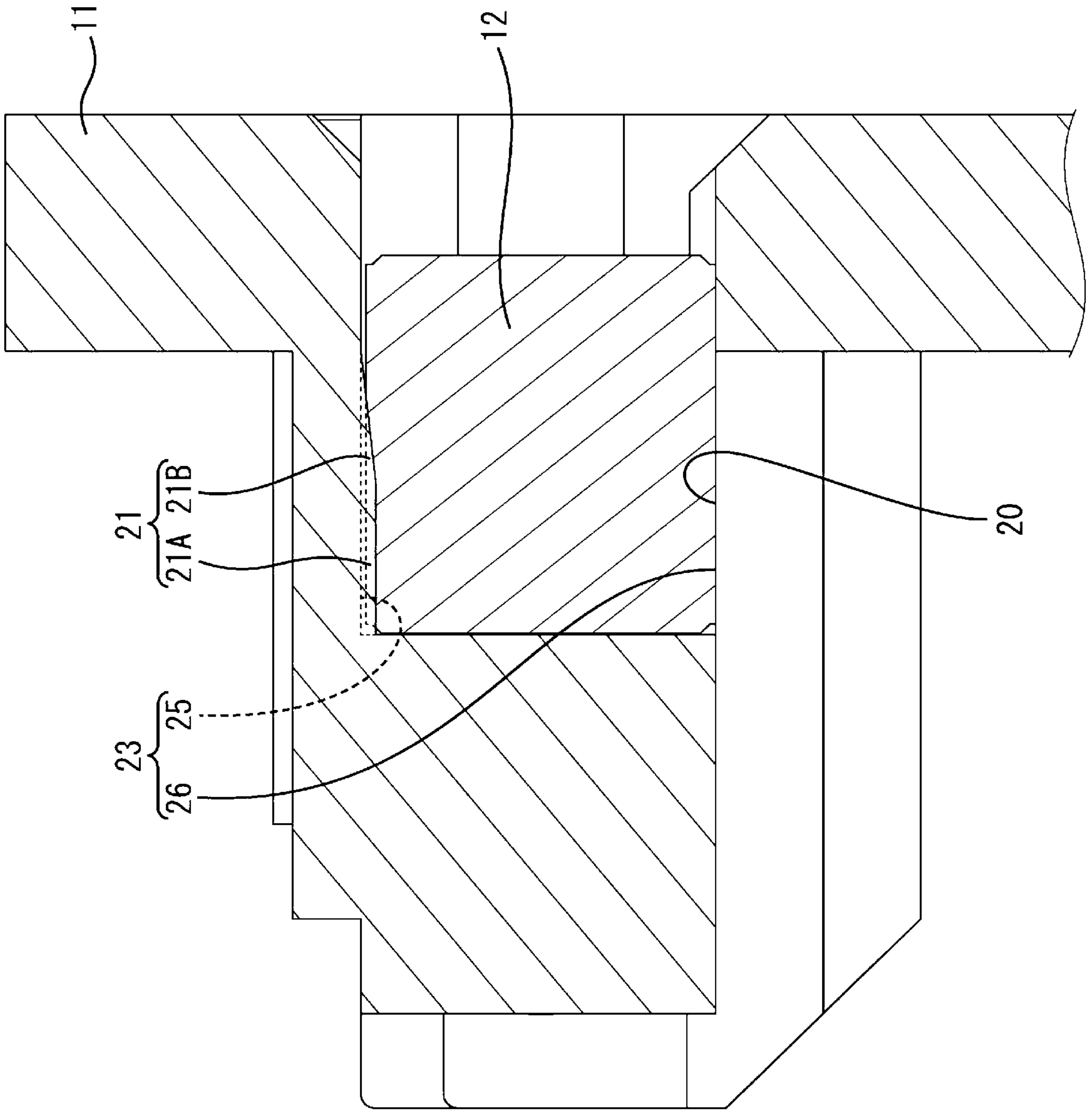
FIG. 6 is a cross-sectional view taken along the line A-A in FIG. 3, illustrating a state in which the ferrite core is received in the receiving portion.

As shown in FIG. 4, the ferrite core 12 is received in the receiving portion 20 of the housing 11 from the rear. In an early stage of the reception, the ferrite core 12 does not interfere with the first protrusions 21 in the receiving portion 20, and is smoothly inserted into the receiving portion 20 due to a small friction resistance applied to the ferrite core 12. When the ferrite core 12 interferes with the first rear-side protrusion 21B, the friction resistance that is applied to the ferrite core 12 gradually increases as it moves forward. At this time, the ferrite core 12 moves forward while deflecting the first deflectable portions 28 outward. When the ferrite core 12 moves further forward, the ferrite core 12 interferes with the first front-side protrusions 21A, and the flat upper surface of the outer peripheral surface 12A of the ferrite core 12 comes into strong contact with the first front-side protrusions 21A. Since the front ends of the first deflectable portions 28 are fixed, the friction resistance that is applied to the ferrite core 12 further increases as it moves forward. When the ferrite core 12 reaches a regular reception position, the ferrite core 12 is interposed between the first protrusions 21 and the second inner surface 26 as shown in FIG. 6, and the ferrite core 12 is held while the rattle is suppressed. With this, the ferrite core 12 is received in the receiving portion 20. As shown in FIG. 10, the ferrite core 12 received in the receiving portion 20 is exposed to the outside of the housing 11 via the first opening 29.

Also, as shown in FIG. 11, when the ferrite core 12 is received in the receiving portion 20, the lower-side fitting groove 81 of the ferrite core 12 is received so as to be fitted to the fitting protrusion 22 of the receiving portions 20. With this, displacement of the ferrite core 12 in the left-right direction can be suppressed.

Further, as shown in FIG. 7, the tubular portions 70 of the terminal fittings 13 are inserted into the first holes 80 of the ferrite core 12 held in the receiving portion 20 from the rear. No second protrusion 31 are provided in the first holes 80. Therefore, the friction resistance that is applied to the tubular portions 70 is small until the front ends of the tubular portions 70 pass through the first holes 80, and thus the insertion is smooth.

Figure 9:
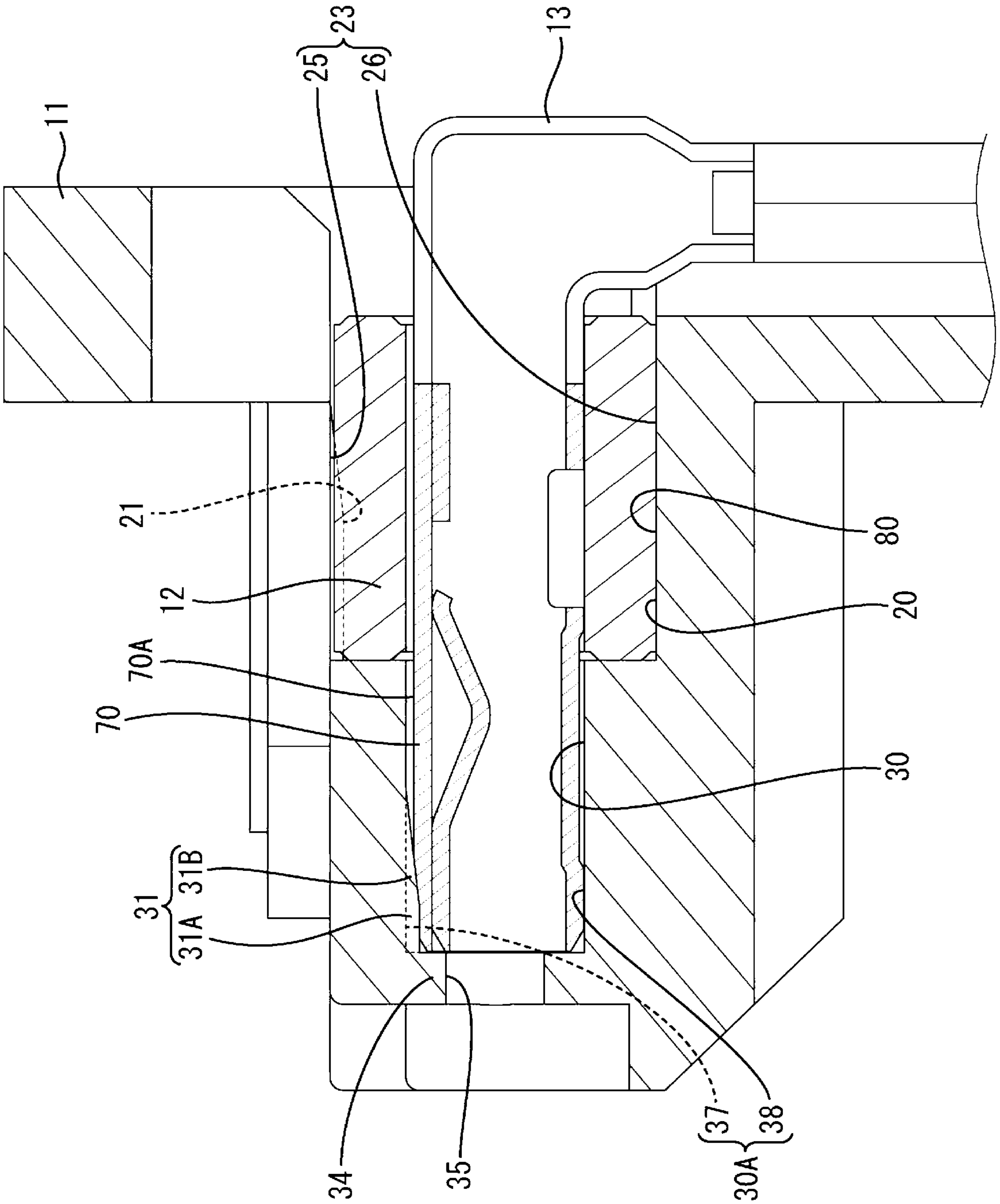
FIG. 9 is a cross-sectional view taken along the line B-B in FIG. 3, illustrating a state in which the terminal fitting is inserted into the cavity constituted by the first holes and the second holes.

After the front ends of the tubular portions 70 have passed through the first holes 80, as shown in FIG. 9, the front ends of the tubular portions 70 are inserted into the second holes 30 arranged in front of the first holes 80. The dimensions, in the up-down direction and the left-right direction, of the second holes 30 are equal to those of the first holes 80, and thus if the position of the ferrite core 12 is not defined, the tubular portions 70 may abut against the peripheral edges of the rear ends of the second holes 30. In contrast, since the ferrite core 12 is held while being interposed between the first protrusions 21 and the second inner surface 26, the first holes 80 and the second holes 30 of the connector 10 are easily lined up in the front-rear direction. Accordingly, the tubular portions 70 are unlikely to abut against the peripheral edges of the rear ends of the second holes 30, and thus the tubular portions 70 are likely to be smoothly inserted into the second holes 30. When the tubular portions 70 are inserted into the second holes 30, the tubular portions 70 interfere with the second rear-side protrusions 31B from a midway position. If the tubular portions 70 interfere with the second rear-side protrusions 31B, the friction resistance that is applied to the tubular portions 70 gradually increases as the tubular portions 70 move forward. At this time, the tubular portions 70 move forward while deflecting the second deflectable portions 32 outward. After having moved further forward, the tubular portions 70 interfere with the second front-side protrusions 31A, and the flat upper surfaces of the outer peripheral surfaces 70A of the tubular portions 70 come into strong contact with the second front-side protrusions 31A. Since the front ends of the second deflectable portions 32 are fixed, the friction resistance that is applied to the tubular portions 70 further increase as they move forward. When the tubular portions 70 reach a regular insertion position, the tubular portions 70 are interposed between the second protrusions 31 and the second surfaces 38, and are held while the rattle is suppressed. With this, the tubular portions 70 are arranged while extending from the inside of the first holes 80 in the inside of the second holes 30. As shown in FIG. 10, the tubular portions 70 arranged inside the second holes 30 are exposed to the outside of the housing 11 via the second openings 33.

Figure 17:
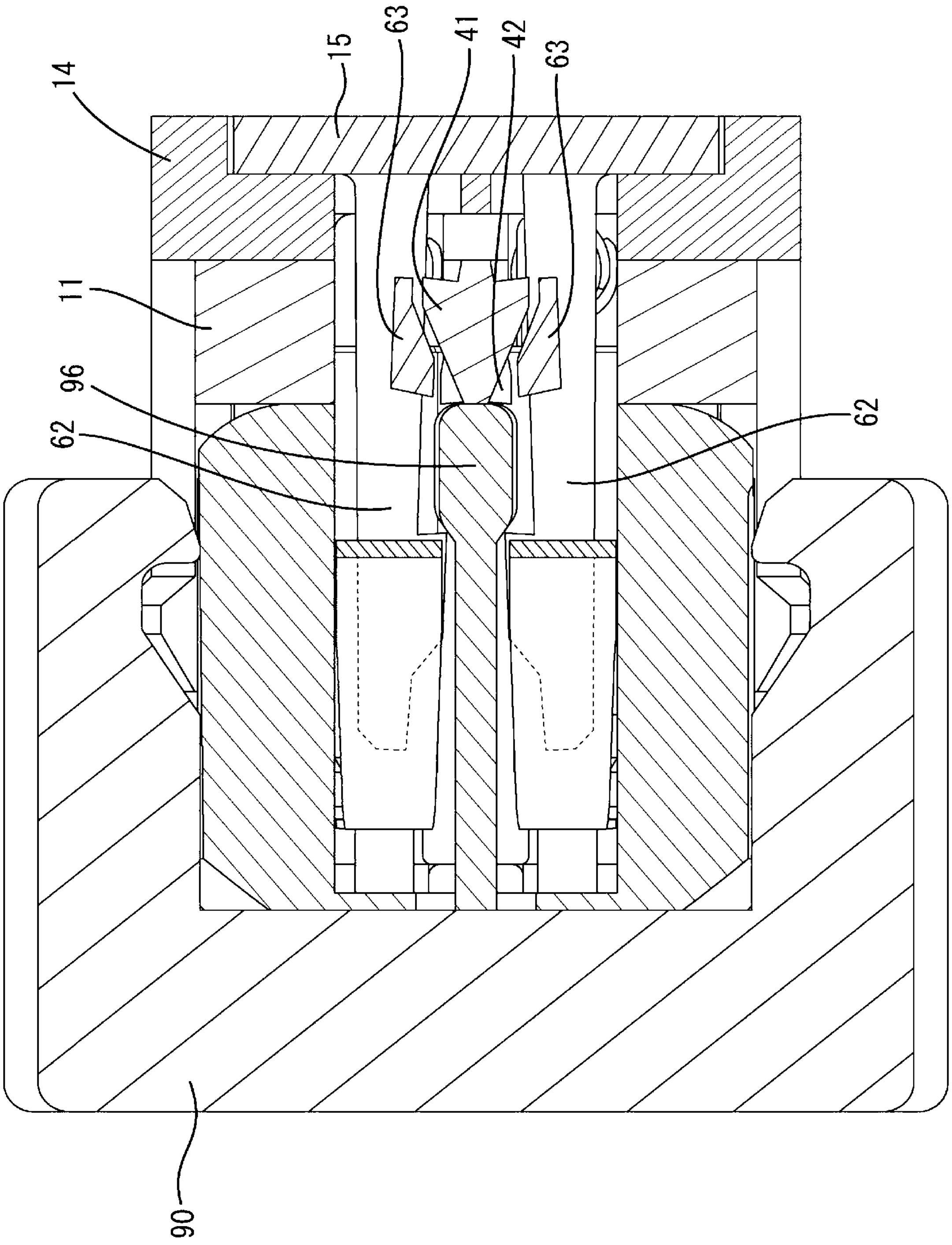
FIG. 17 is a cross-sectional view taken along a line H-H in FIG. 14.

Then, as show in FIG. 12, the cover member 14 is attached to the housing 11, and covers the rear sides of the terminal fittings 13. Then, as shown in FIG. 13, the detection member 15 is provisionally engaged with the housing 11. When the detection member 15 is provisionally engaged, the pair of the second elastic engagement portions 61 of the detection member 15 are inserted into the pair of first through holes 51 of the cover member 14, and the pair of lock arms 62 of the detection member 15 are inserted into the pair of second through holes 52 of the cover member 14. The pair of second elastic engagement portions 61 are arranged between the receiving portion 20 of the housing 11 and the pair of first elastic engagement portions 43. Also, as shown in FIG. 17, after the connector 10 is engaged with the counterpart connector 90, the detection member 15 is actually engaged with the housing 11. At this time, as shown in FIG. 15, the lock arms 62 of the detection member 15 are engaged with the locked portion 96 of the counterpart connector 90. Also, as shown in FIG. 14, the lock arms 62 disengage the electrical connection between the counterpart terminal fittings 92 and the short-circuit terminals 93. Also, as shown in FIG. 15, the pair of second elastic engagement portions 61 fill the gap formed between the ferrite core 12 arranged inside the receiving portion 20 and the pair of first elastic engagement portions 43.

Note that if the detection member 15 is to be moved from a provisional stop position to an actual engaging position in a state in which the connector 10 is not regularly fitted to the counterpart connector 90, after the expansion of the pair of lock arms 62 in the left-right direction by the guide portion 42, the expansion will not be maintained by the locked portion 96, and the lock arms 62 will be closed (see FIGS. 16 and 17). As a result, the restriction portion 41 interferes with the interference portions 63, and restricts the forward movement of the detection member 15. That is to say, when the detection member 15 has been engaged with the counterpart connector 90, it is possible to confirm that the connector 10 has regularly been engaged with the counterpart connector 90.

Effects of Connector 10

According to the connector 10, the ferrite core 12 arranged inside the receiving portion 20 of the housing 11 is held while being interposed between the first protrusions 21 and the second inner surface 26. Also, with this, the ferrite core 12 is positioned, and thus the insertion of the terminal fittings 13 into the first holes 80 of the ferrite core 12 is easy, and the insertion of the terminal fittings 13 into the second holes 30 arranged in front of the first holes 80 is also easy. Moreover, since the first protrusions 21 are provided only on the upper side of the receiving portion 20, the positions of the terminal fittings 13 in the up-down direction are more likely to be secured than a configuration in which the first protrusions 21 are provided on both the upper and lower sides.

Furthermore, since the first protrusions 21 are arranged on the back surface 24 side of the receiving portion 20, the ferrite core 12 interferes with the first protrusions 21 only in a later stage of the insertion, and as a result, it is possible to reduce the frictional force in the early stage of the insertion.

Furthermore, the first protrusions 21 protrude from the inner surfaces of the first deflectable portions 28. Therefore, when the ferrite core 12 is being received in the receiving portion 20, the first deflectable portions 28 are pressed against the outer peripheral surface 12A of the ferrite core 12 via the first protrusions 21 and deflect outward, making it possible to reduce the frictional force that occurs during the reception. Moreover, the connector 10 can improve the holding force of holding the ferrite core 12, using the elastic recovery force of the first deflectable portions 28.

Furthermore, the outer peripheral surface 12A of the ferrite core 12 received in the receiving portion 20 is exposed to the outside of the housing 11 via the first opening 29. Accordingly, it is possible, for example, to visually check from the outside through the first opening 29 whether or not the ferrite core 12 is arranged in the receiving portion 20.

Furthermore, the outer peripheral surface 12A of the ferrite core 12 includes the fitting grooves 81, and the second inner surface 26 of the receiving portion 20 includes the fitting protrusion 22. Therefore, as a result of the fitting protrusion 22 being fitted into the fitting groove 81, the ferrite core 12 is prevented from being displaced in the left-right direction (the gap portions 27), and it is possible to maintain the state in which the first protrusions 21 and the outer peripheral surface 12A of the ferrite core 12 are in contact with each other.

Furthermore, since the tubular portions 70 of the terminal fittings 13 are held in the second holes 30, the terminal fittings 13 that penetrate the ferrite core 12 and are arranged in the first holes 80 can be maintained. Also, with this, the terminal fittings 13 can be positioned, and thus the terminal fittings 13 can be easily connected to the counterpart terminal fittings 92. Moreover, since the second protrusions 31 are provided only on the upper side of the second holes 30, the positions of the terminal fittings 13 in the up-down direction are more likely to be secured than a configuration in which the second protrusions 31 are provided on both the upper and lower sides.

Furthermore, since the second protrusions 31 protrude only from, out of the inner peripheral surfaces 30A of the second holes 30 and the outer peripheral surfaces 70A of the tubular portions 70, the inner peripheral surfaces 30A of the second holes 30. If the second protrusions 31 protrude from the outer peripheral surfaces 70A of the tubular portions 70, the second protrusions 31 may scrape the inner peripheral surface of the ferrite core 12 when the terminal fittings 13 are inserted into the first holes 80. However, according to the connector 10, this problem can be avoided since the second protrusions 31 are provided only on the housing 11 side. Also, the terminal fittings 13 do not interfere with the second protrusions 31 in the first holes 80, and thus it is possible to reduce the frictional force that is applied to the terminal fittings 13 when inserting the terminal fittings 13 into the first holes 80.

Furthermore, the second protrusions 31 protrude from the second deflectable portions 32. Therefore, when the terminal fittings 13 are being inserted into the second holes 30, the second deflectable portions 32 are pressed by the tubular portions 70 via the second protrusions 31 and deflect outward, making it possible to reduce the frictional force that occurs during the insertion. Moreover, the connector 10 can improve the holding force of holding the terminal fittings 13, using the elastic force of the second deflectable portions 32.

Furthermore, the tubular portions 70 are exposed to the outside of the housing 11 via the second openings 33. Accordingly, it is possible, for example, to visually check from the outside through the second openings 33 whether or not the tubular portions 70 are arranged in the second holes 30.

Other Embodiments of the Present Disclosure

The embodiments disclosed herein are to be construed as being exemplary and non-limiting in all respects.

(1) The above-described embodiment employs a configuration in which the first protrusions are provided on the upper side of the inner surface of the receiving portion, but a configuration is also possible in which the first protrusions are provided on the lower side, the first protrusions are provided on the left side, or the first protrusions are provided on the right side. Also, a configuration is also possible in which the first protrusions are provided on both the upper and lower side of the inner surface of the receiving portion, the first protrusions are provided on both the left and right sides, or the first protrusions are provided on the upper and lower sides and the left and right sides.

(2) The above-described embodiment employs a configuration in which the second protrusions are provided on the upper side of the inner peripheral surfaces of the second holes, but a configuration is also possible in which the second protrusions are provided on the lower side, the second protrusions are provided on the left side, or the second protrusions are provided on the right side. Also, a configuration is possible in which the second protrusions are provided on both the upper and lower sides of the inner peripheral surfaces of the second holes, the second protrusions are provided on both the left and right sides, or the second protrusions are provided on the upper and lower sides, and the left and right sides.

(3) The above-described embodiment employs a configuration in which the first protrusions are provided on the housing, but a configuration is also possible in which the first protrusions are provided on the ferrite core, or the first protrusions are provided on both the housing and the ferrite core.

(4) The above-described embodiment employs a configuration in which the second protrusions are provided on the housing, but a configuration is also possible in which the second protrusions are provided on the terminal fittings, or the second protrusions are provided on both the housing and the terminal fittings.

(5) The above-described embodiment employs a configuration in which the connector includes the first deflectable portions, but a configuration is also possible in which the connector does not include any first deflectable portion.

(6) The above-described embodiment employs a configuration in which the connector includes the second deflectable portions, but a configuration is also possible in which the connector does not include any second deflectable portion.

(7) The above-described embodiment employs a configuration in which the connector includes the first opening, but a configuration is also possible in which the connector does not include any first opening.

(8) The above-described embodiment employs a configuration in which the connector includes the second openings, but a configuration is also possible in which the connector does not include any second opening.

(9) The above-described embodiment employs a configuration in which the ferrite core includes the fitting grooves, and the receiving portion includes the fitting protrusion, but another configuration is also possible. For example, a configuration is also possible in which the ferrite core includes a fitting protrusion, and the receiving portion includes a fitting groove. Also, a configuration is possible in which the ferrite core includes both a fitting groove and a fitting protrusion, and the receiving portion includes both a fitting groove and a fitting protrusion. Also, the ferrite core does not need to include both a fitting groove and a fitting protrusion, and the receiving portion does not need to include both a fitting groove and a fitting protrusion.

Figure 18:
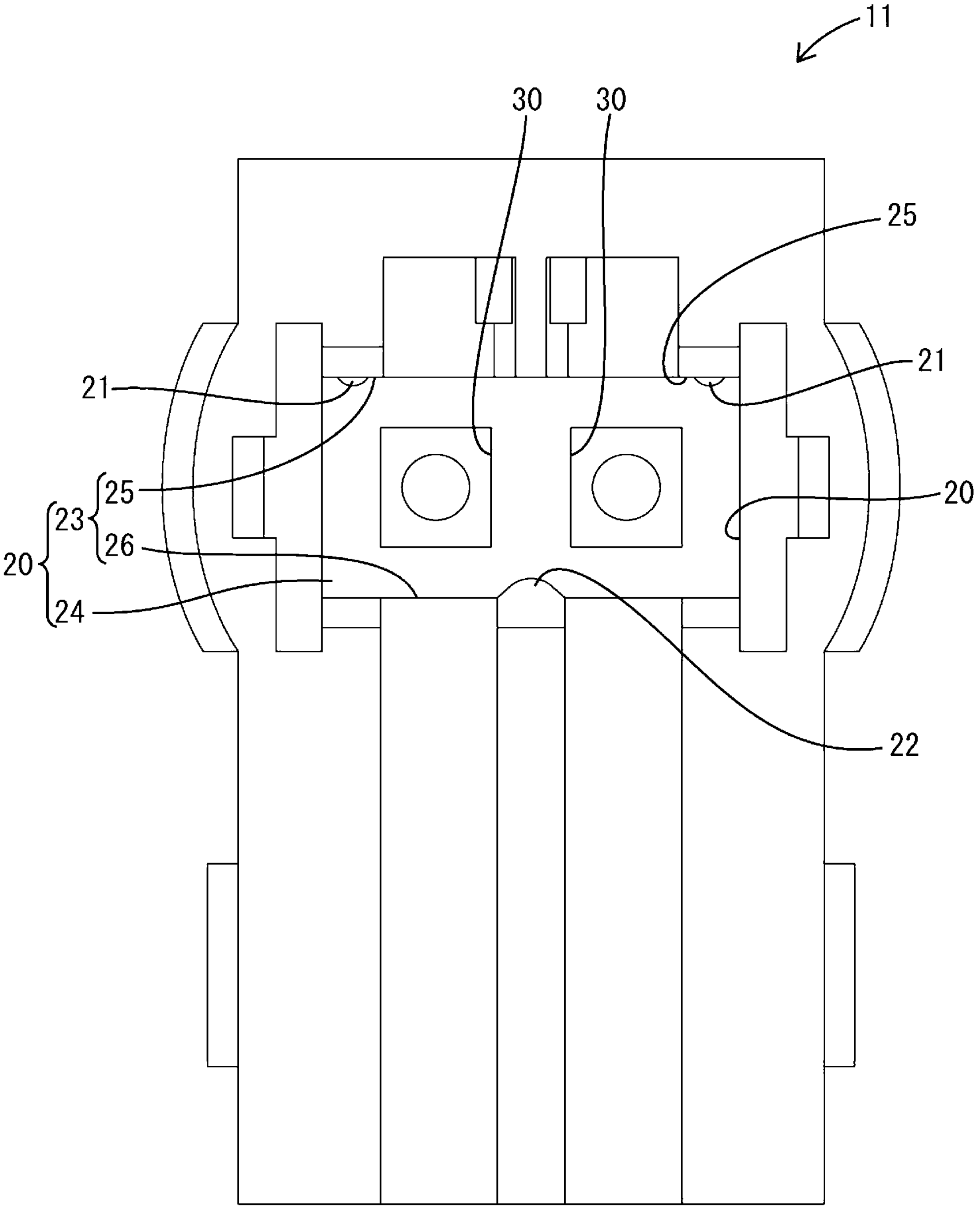
FIG. 18 is a diagram corresponding to FIG. 3 according to another embodiment.

(10) The above-described embodiment employs a configuration in which the connector includes the second protrusion, but as shown in FIG. 18, a configuration is also possible in which the connector does not include any second protrusion.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a ferrite core including a fitting groove; and a housing including a receiving portion that receives the ferrite core, wherein the receiving portion includes a deflectable portion that is deflectable and deformable outward, and a fitting protrusion provided on an inner surface of the receiving portion opposing the deflectable portion and configured to be fitted into the fitting groove, an inner peripheral surface of the deflectable portion includes a plurality of first protrusions, the fitting protrusion is between two of the plurality of first protrusions in a plan view, and the deflectable portion presses the ferrite core against a surface of the receiving portion and holds the ferrite core in the receiving portion with the plurality of first protrusions being in contact with an outer peripheral surface of the ferrite core.

2. The connector according to claim 1, wherein the receiving portion includes an opening that exposes the outer peripheral surface of the ferrite core received in the receiving portion to the outside of the housing.

3. The connector according to claim 1, wherein the inner peripheral surface of the receiving portion includes a first inner surface and a second inner surface that face each other, the ferrite core and the plurality of first protrusions are arranged between the first inner surface and the second inner surface, the housing has a gap portion that opens the receiving portion to a side different from a side on which the first inner surface and the second inner surface face each other, and at least one of the first inner surface and the second inner surface, and a portion of the outer peripheral surface of the ferrite core that faces the at least one inner surface have parts that are fitted to each other in a male-female fitting manner so as to restrict displacement of the ferrite core toward the gap portion.

4. The connector according to claim 1, wherein the deflectable portion includes a plurality of deflectable portions each provided with one of the plurality of first protrusions and deflectable and deformable in a same direction.

5. The connector according to claim 4, wherein the receiving portion includes an opening that is provided between two adjacent deflectable portions, open in a direction different from a direction in which the ferrite core is receivable in the receiving portion, and exposes the outer peripheral surface of the ferrite core received in the receiving portion to the outside of the housing.

6. The connector according to claim 1, wherein the housing includes gap portions provided on opposing sides of the receiving portion and configured to receive a detection portion to be engaged with the housing, and the fitting protrusion is between the gap portions in a plan view.

* * * * *